United States Patent [19]

Kawagoshi et al.

[11] 3,943,097

[45] Mar. 9, 1976

[54] POLYVINYL CHLORIDE COMPOSITIONS CONTAINING TRIXYLYL PHOSPATE AND A SECOND PLASTICIZER

[75] Inventors: Fumio Kawagoshi, Aichi; Motohiro Moriwaki, Nagoya, both of Japan

[73] Assignee: Mitsubishi Monsanto Chemical Company, Tokyo, Japan

[22] Filed: Aug. 17, 1973

[21] Appl. No.: 389,131

[30] Foreign Application Priority Data

Aug. 17, 1972 Japan............................... 47-82271

[52] U.S. Cl....................... 260/45.7 P; 260/30.6 R
[51] Int. Cl.²............................................ C08K 5/49
[58] Field of Search.................... 260/30.6 R, 45.7 P

[56] References Cited

UNITED STATES PATENTS

| | | | |
|---|---|---|---|
| 2,885,377 | 5/1959 | Knowles et al. | 260/45.7 |
| 3,542,710 | 11/1970 | Glatti | 260/30.6 |
| 3,553,155 | 1/1971 | Garrett | 260/30.6 |
| 3,786,011 | 1/1974 | Price et al. | 260/30.6 |

Primary Examiner—Eugene C. Rzucidlo
Attorney, Agent, or Firm—Oblon, Fisher, Spivak, McClelland & Maier

[57] ABSTRACT

A sheet or film of a vinyl chloride resin composition suitable for outdoor agricultural purposes is prepared by blending a trixylyl phosphate stabilizer with a vinyl chloride.

3 Claims, No Drawings

POLYVINYL CHLORIDE COMPOSITIONS CONTAINING TRIXYLYL PHOSPATE AND A SECOND PLASTICIZER

BACKGROUND OF THE INVENTION

1. Field of the Invention:

The present invention relates to a vinyl chloride resin composition. More particularly, the present invention relates to a vinyl chloride resin composition which is molded into films or sheets and is suitable for agricultural uses as an excellent weather-proofing material.

2. Description of the Prior Art:

In recent years, with the recent advances in the modernization of agricultural techniques, plant cultivation in houses has been actively pursued, and, as covering materials for the houses used in plant cultivation, such materials as glass sheets, polyethylene films, polyvinyl chloride films, ethylene-vinyl acetate copolymer films, and the like have been used. At the present time, polyvinyl chloride films are preferably and predominantly used because of their excellent heat retaining properties, transparency, strength, workability, and the like, and because they are relatively inexpensive. However, when the polyvinyl chloride films are used out-of-doors for several months they generally become brown and deteriorate. Polyvinyl chloride films as used for molding purposes in agricultural techniques are normally stabilized by incorporating a light, heat and oxidation stabilizer such as an organotin compound, a metallic soap, a lead stabilizer, an organocadmium compound, an organobarium compound, an antioxidant, an ultraviolet absorbent, or the like in the films to prevent the deterioration of the molded films. However, these stabilizers have had to be used in relatively very large amounts to stabilize the polyvinyl chloride films. Of course, when the stabilizers are added to the films in large amounts, some of the stabilizers improve the weather-proofing capability of the molded articles, while their presence decreases such physical properties as the workability, transparency, or the like of the films. For example, if a large amount of a metallic soap stabilizer is blended with the polyvinyl chloride when it is molded, a phenomenon known as "plating out" occurs which spoils the appearance of molded article, decreases the processing efficiency and decreases the transparency of the film. Furthermore, for example, when a large amount of an ultraviolet absorbent is blended with the polyvinyl chloride, the molded article turns a yellow color so that when the film is used for agricultural purposes, the film absorbs the light of wavelengths which are necessary for plant growth. Thus, the growth of some types of plants is occasionally hindered, because the region of the spectrum which is absorbed, is generally within the range of 300 to 400 milimicrons. For these reasons improvements in the weather-proofing properties of polyvinyl chloride blended with these stabilizers have been difficult to obtain. One method of improving the weather-proofing properties of the films has been to incorporate a widely employed additive such as an epoxy compound or tricresylphosphate (hereinafter abbreviated as "TCP") to assist the stabilizers. These additives, particularly TCP, are very effective in improving the weather-proofing properties of the films. However, only a limited amount of the supplemental additive can be incorporated in the film. If these amounts are exceeded, detrimental things occur. For example in the case of epoxy resins, bleeding of the resin from the film occurs, i.e., a liquid material oozes out onto the surface of the molded film, and, as a consequence, the films adhere to each other which makes separation of the films more difficult and which increases the physical brittleness of the films. Also, excessive amounts of TCP in the molded polyvinyl chloride materials decreases their weather-proofing properties and often decreases their thermal resistance. Thus, when the conventional polyvinyl chloride films have been used for agricultural purposes out-of-doors, their useful lifetime is generally about one year, and at best no more than two years.

A need, therefore, continues to exist for a film which is suitable for agricultural purposes and which can be used out-of-doors for more than two years such as on plant cultivation houses.

SUMMARY OF THE INVENTION

Accordingly, one object of the present invention is to provide a plastic film for use out-of-doors which has stable weather-proofing properties.

Another object of the invention is to provide a stabilized polyvinyl chloride film suitable for extended outdoor use which contains a phosphate additive which imparts improved weather-proofing characteristics to the resin.

Briefly, these objects and other objects of the invention as hereinafter will become more readily apparent can be attained by providing a weather proofed polyvinyl chloride sheet or film suitable for agricultural purposes which comprises a blend of trixylyl phosphate (hereinafter abbreviated as TXP) in a polyvinyl chloride raw material.

DETAILED DESCRIPTION OF THE PREFERRED EMBODIMENTS

The xylyl phosphate compounds of the present invention contain xylyl radicals, wherein the two methyl groups of the xylyl radicals can be in an ortho, meta or para position relative to one another. Furthermore, mixtures of ortho, meta or para xylyl radicals can be used in the xylyl phosphate molecules. Suitable TXP species include tri(2,3-xylyl phosphate), tri(2,4-xylyl phosphate), tri(2,5-xylyl phosphate), tri(2,6-xylyl phosphate), tri(3,4-xylyl phosphate), and tri(3,5-xylyl phosphate) as well as mixtures of these trixylyl phosphate compounds. The amount of TXP used in the polyvinyl chloride is preferably 1 to 20 parts, by weight based on 100 parts by weight of the polyvinyl chloride. If the amounts of TXP used is less than this range, the desired weather-proofing improvements cannot be attained. On the other hand, if the amount of TXP used is greater than this range, other properties of the film such as for example, the molding properties and the thermal resistance are decreased after the film has been molded and the effect of weather-proofing is gradually reduced.

The weather-proof polyvinyl chloride resin composition of the present invention can be easily obtained by blending 100 parts by weight of a polyvinyl chloride resin such as for example, one which has a polymerization degree of 1400 with 1 to 20 parts by weight of TXP, a plasticizer in an amount which is consistent with the desired objects of the film and other stabilizing additives and the like. Polyvinyl chloride with an average polymerization degree of about 1000 to 1500 is preferable for use as a film or sheet for agricultural purposes, although polyvinyl chloride with an average polymerization degree of about 800 to 3000, which is commonly used in these applications, may also be employed. Suitable plasticizers which can be used in the film of the present invention include phthalic acid esters such as di-2-ethylhexyl phthalate, butylbenzyl phthalate, dibutyl, phthalate, or the like, adipic acid esters such as di-2-ethylhexyl adipate, di-isodecyl adipate, and the like, and sebacid acid esters such as di-2-ethylhexyl sebacate, di-octyl sebacate, and the like. Suitable stabilizers which also can be used include cadmium stearate, barium stearate, cadmium-barium stearate, dibasic lead stearate, dibasic lead phosphite, dibutyl tin dilaurate, and the like. As shown on the Examples which follow, blending of a vinyl chloride resin with TXP, which acts as a specific weather-proofing agent, yields a product which when molded, yields a film suitable for outdoor agricultural purposes and which has very substantial weather-proofing characteristics. Thus, a film obtained by blending 100 parts by weight of a polyvinyl chloride with 1 part by weight of TXP has almost the same weather proofing characteristics as a film obtained by blending 100 parts by weight of the polyvinyl chloride with 5 parts by weight of TCP which is well-known weather-proofing stabilizer. Thus, TXP is sufficiently effective as a weather-proofing stabilizer in quantities much less than the conventional stabilizers. In addition, the presence of TXP does not adversely effect other stabilizers which may also be present in the composition, such as thermal resistance stabilizers, nor is the stabilizer influenced by the amount and kind of plasticizer used. The composition of the present invention may be together with any other weather-proofing agent, stabilizer or assisting agent.

Having generally described this invention, a further understanding can be obtained by reference to certain specific examples which are provided herein for purposes of illustration only and are not intended to be limiting unless otherwise specified.

In the Examples the term "part" means "part by weight".

EXAMPLES 1 to 14

100 Parts of a polyvinyl chloride (polymerization degree 1400) were blended with DOP (di-2-ethylhexylphthalate) and TXP [a trixylyl phosphate mixture chiefly comprising tri(2,4-xylyl) phosphate and a trixylyl phosphate mixture comprising chiefly tri(3,5-xylyl phosphate)] in the ratios shown in Table I. To the polyvinyl chloride mixture was added 3 parts of a Cd-Ba complex stabilizer, and the mixture was milled by means of a test calender at 160°C for 7 minutes whereby a film of 0.1 mm and a sheet of 0.5 mm in thickness was obtained. The weather-proofing characteristics of the film evaluated by exposing the film out-of-doors to the weather on a closed house facing the south and observing any changes in the film with the naked eye. The sheet on the other hand, was subjected to a thermal resistance test in a gear oven at 180°C. The results are shown in Table I.

Table I

| | Sample No. | 1 | 2 | 3 | 4 | 5 | 6 | 7 | 8 | 9 |
|---|---|---|---|---|---|---|---|---|---|---|
| Agent blended | TCP(PHR) | — | — | — | — | — | — | — | — | — |
| | TXP[tri(2,4-xylyl phosphate)](PHR) | 1 | 3 | 5 | 7 | 10 | 20 | 50 | — | — |
| | TXP[tri(3,5-xylyl phosphate)](PHR) | — | — | — | — | — | — | — | 1 | 3 |
| | DOP(PHR) | 49 | 47 | 45 | 43 | 40 | 30 | — | 49 | 47 |
| Evaluation of weather-proofing characteristics | after 3 months | O | O | O | O | O | O | O | O | O |
| | 6 | Ox | O | O | O | O | O | O | Ox | O |
| | 9 | Ox | O | O | O | O | O | O | Ox | O |
| | 12 | Ox | O | O | O | O | O | O | Ox | O |
| | 18 | Δ | Ox | Ox | O | O | O | Ox | Δ | Ox |
| | 24 | X | Δx | Δ | Ox | O | Ox | Ox | X | Δ |
| Evaluation of thermal resistance characteristics | Initial coloring | color-less | color-less | color-less | color-less | color-less | light yellow | yellow | color-less | color-less |
| | Duration (minute) | 100 | 100 | 100 | 100 | 100 | 80 | 40 | 100 | 100 |

| | Sample No. | 10 | 11 | 12 | 13 | 14 | 15* | 16* | 17* |
|---|---|---|---|---|---|---|---|---|---|
| Agent blended | TCP(PHR) | — | — | — | — | — | — | — | 5 |
| | TXP[tri(2,4-xylyl phosphate)](PHR) | — | — | — | — | — | — | — | — |
| | TXP[tri(3,5-xylyl phosphate)](PHR) | 5 | 7 | 10 | 20 | 50 | — | — | — |
| | DOP(PHR) | 45 | 43 | 40 | 30 | — | 50 | 50 | 45 |
| Evaluation of weather-proofing characteristics | after 3 months | O | O | O | O | O | O | O | O |
| | 6 | O | O | O | O | O | Δ | Δ | Ox |
| | 9 | O | O | O | O | O | X | X | Δ |
| | 12 | O | O | O | O | O | X | X | Δx |
| | 18 | Ox | O | O | O | Ox | X | X | X |
| | 24 | Δ | Ox | O | Ox | Δ | X | X | X |
| Evaluation of thermal resistance characteristics | Initial coloring | color-less | color-less | color-less | light yellow | yellow | color-less | — | — |
| | Duration (minute) | 100 | 100 | 100 | 80 | 40 | 100 | — | — |

Note: (1) *shows the control test examples.
(2) PHR represents the amount of the particular additive shown in parts by weight blended with 100 parts by weight of the

Table I-continued

| Sample No. | 7 | 2 | 3 | 4 | 5 | 6 | 7 | 8 | 9 |
|---|---|---|---|---|---|---|---|---|---| polyvinyl chloride resin.
(3) Evaluation of weather-proofing characteristics:
O : unchanged
Ox : a few brown spots
Δ : some brown spots
Δx : numerous brown spots
X : entire surface is brown.
(4) Evaluation of thermal resistance characteristics: The thermal resistance of the sheet is measured as the time it takes the sheet to become discolored in a gear oven at 180°C.

As is apparent from the data of Table I, the TXP blended sample has excellent weather-proofing characteristics. The data indicates that a film containing 1 part of TXP exhibits superior weather-proofing characteristics in comparison to a film containing 5 parts of TCP. In addition, a film sample which has blended with 3 parts of TXP exhibited superior weather-proofing characteristics even when allowed to stand outside for more than 12 months. Although the weather-proofing properties of the samples increasingly improved with additional amounts of TXP, an upper limit of up to about 20 parts is established beyond which the weather-proofing characteristics do not improve even if the amount of TXP added is increased. If the amount of TXP blended in the composition exceeds 20 parts, the previously recognized detrimental phenomenon known as "plating-out" occurs on the surface of the calender and the thermal resistance of the film is decreased. In one instance, a film prepared by blending 100 parts of a vinyl chloride resin with 10 parts of TXP exhibited such outstanding weather-proofing properties that it withstood outdoor use for more than two years.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A polyvinylchloride composition useful as a molded, weather-proof sheet or film for agricultural purposes, which comprises:
    a mixture of from 1 to 20 parts by weight of trixylyl phosphate as a weather-proofing stabilizer and 49 to 30 parts by weight of a plasticizer per 100 parts by weight of polyvinylchloride.

2. The polyvinyl chloride resin composition of claim 1, wherein said trixylyl phosphate is selected from the group consisting of tri(2,3-xylyl phosphate), tri(2,4-xylyl phosphate), tri(2,5-xylyl phosphate), tri(2,6-xylyl phosphate), tri(3,4-xylyl phosphate), tri(3,5-xylyl phosphate), and mixtures thereof.

3. The polyvinyl chloride composition of claim 1, wherein said polyvinyl chloride has an average polymerization degree of about 1000 to 1500.

* * * * *